United States Patent [19]

Oudejans et al.

[11] Patent Number: 4,946,821
[45] Date of Patent: Aug. 7, 1990

[54] PROCESS FOR THE PREPARATION OF A HYDROGENATION CATALYST

[75] Inventors: Johannes C. Oudejans, Maassluis; Dirk Verzijl, Barendrecht, both of Netherlands

[73] Assignee: Lever Brothers Company, New York, N.Y.

[21] Appl. No.: 319,839

[22] Filed: Mar. 7, 1989

Related U.S. Application Data

[63] Continuation of Ser. No. 81,491, Aug. 4, 1987, abandoned.

[30] Foreign Application Priority Data

Aug. 25, 1986 [EP] European Pat. Off. ............ 86201463

[51] Int. Cl.$^5$ .................... B01J 21/04; B01J 23/72; B01J 23/74
[52] U.S. Cl. .................... 502/335; 502/332; 502/346
[58] Field of Search ............ 502/332, 335, 346

[56] References Cited

U.S. PATENT DOCUMENTS

| 3,896,053 | 7/1975 | Broecker et al. | 502/335 |
| 4,229,361 | 10/1980 | Cahen | 260/409 |
| 4,307,248 | 12/1981 | Barnett et al. | 564/358 |
| 4,657,889 | 4/1987 | Ganguli et al. | 502/335 |

FOREIGN PATENT DOCUMENTS 92878 11/1983 European Pat. Off.
168091 1/1986 European Pat. Off.

Primary Examiner—W. J. Shine
Attorney, Agent, or Firm—Milton L. Honig

[57] ABSTRACT

The invention provides a metal (Z=27-29)/alumina catalyst with an atomic ratio of active metal to aluminum between 12 and 1.5, having an active metal content of at least 75% in the activated catalyst, an active metal surface area between 60 and 150 m$^2$/g of metal, characterized in that the soyabean selectivity is below 2%, preferably below 1%.

The invention also provides a process for the preparation of these catalysts and a method for the hydrogenation of saturated organic compounds using the catalyst.

3 Claims, No Drawings

PROCESS FOR THE PREPARATION OF A HYDROGENATION CATALYST

This is a continuation application of Ser. No. 081,491, filed Aug. 4,1987, now abandoned.

The invention relates to a metal/alumina catalyst in which the active metal has an atomic number (Z) between 27 and 29, to a process for the preparation of the catalyst and to a process for the hydrogenation of unsaturated compounds, in particular fatty compounds using such a catalyst.

Such metal/alumina catalysts are known in the art and they can be prepared by various processes.

Two main processes involve:

(1) Impregnation with a metal salt solution of existing (sometimes pre-shaped) alumina material, followed by drying, calculation and reduction.

One example of such a process is EP-A- 92 878 (Unilever).

(2) Precipitation from a solution of metal hydroxy carbonate and alumina hydrate or metal aluminum hydroxy carbonate using an alkaline precipitating agent. Often co-precipitation of the active metal and aluminum is effected, as described in US-A- 4 307 24 B (Barnett), and sometimes sequential precipitation is disclosed as e.g. EP-A- 16168 091 (Unilever).

Subsequently the precipitate is filtered, washed, dried, optionally calcined and activated (reduced).

The physical properties and catalytic characteristics of the catalyst are dependent on the preparative route and on drying, calcining and activation.

There are, of course, certain relations between physical constants like porosity, BET surface area, degree of reduction to active metal, degree of metal dispersion, etc. and catalytic performance like selectivity, activity, lifetime of the catalyst, etc.

For catalyst, used for the hydrogenation of organic material, in particular of fatty compounds such as unsaturated ariglycerides, the selectivity is very important, at the formation of fully saturated triglyceride, has been recognized as undesirable because this may cause crystal formation ("sandiness") in products like edible emulsions, e.g. marqarine and and low-fat spreads. The selectivity of the catalyst is here expressed as the percentage of solid fat at 30° C in a soybean oil hydrogenated to an iodine value (I.v.) of 90, which is more fully described below.

The present invention provides a selective metal (Z=27-29)/alumina catalyst with an atomic ratio of active metal to aluminum between 12 and 1.5, preferably between 10 and 3, an active metal surface area between 60 and 150 m$^2$/g of nickel and between 1 and 20 m$^2$/g for copper and/or cobalt, which catalyst has a selectivity below 2% (percentage of solid phase at 30° C. obtained after hydrogenating a standard soyabean oil with an I.v. of 130 to an I.v. of 90 under conditions described below).

In a preferred embodiment, the selectivity of the catalyst is even below 1%.

Also the catalysts according to the present invention usually have a BET total surface area between 90 and 450 m$^2$/g and an average pore radius between 2 and 20, preferably between 4 and 15 nanometers.

The present invention further provides a convenient method for the preparation of a hydrogenation catalyst which comprises alumina and an active metal (M) having an atomic number (Z) from 27 to 29, characterized in that an ammoniacal metal ion solution is combined with an aqueous solution of an aluminum compound, that ammonia is removed by keeping it at, or near, the boiling point for 20 to 180 minutes, thereby precipitating inter alia $M_6Al_2(OH)_{16}CO_3 19 \; 4H_2O$. The precipitate is collected, dried and reduced with hydrogen.

Suitable aluminum compounds are alkali aluminate and other aluminum salts. Suitable metal (M) compounds for preparing the ammoniacal metal solution are e.g. carbonates etc.

Although the invention provides hydrogenation catalysts and a method for the preparation thereof, in which the active metal is cobalt (Z=27), nickel (Z=28) or copper (Z=29), it is preferred to have cobalt and/or nickel as the active metal, and nickel is more preferred.

When preparing the catalyst, it is preferred to combine the ammoniacal metal ion solution and the aluminum salt solution at temperatures between 10° C. and 85° C. in order to avoid premature precipitation of aluminum ions.

For optimum results it is recommended that an aluminum salt solution is added to an ammoniacal metal ion solution, the solutions being at a temperature between 15° C. and 50° C. This usually results in a combined solution of the two ingredients from which ammonia is removed by boiling and a precipitate predominantly containing $M_6Al_2(OH)_{16}CO_3 \cdot 4H_2O$ (depending on the M/Al atomic ratio) is formed. Also metal (M) hydroxy carbonate can be precipitated, especially at high M/Al atomic ratios.

The precipitation can be effected under various conditions. Thus, the precipitation temperature of the suspension is generally between 60° C. and 100° C., preferably between 75° C. and 100° C. During the precipitation the suspension generally has a pH value between 11.5 and 9.5. The pH value drops during the heating because the ammonium complex slowly decomposes and ammonia is removed. This precipitation by heating usually takes from 15 minutes to 24 hours, preferably 1 to 8 hours.

Further, the precipitation often takes place in concentrations such that the final precipitate contains the active metal (M) in weight percentages between 30 and 60, preferably between 35 and 50.

In order to increase resistance of the catalyst to poisoning, (particularly with sulphur and/or carbon), it is often advantageous to incorporate in the catalyst a small amount of another metal (compound) as promoter which often also facilitates activation (lower activation temperature). Suitable promoters contain particularly the elements molybdenum, lanthanum, barium, calcium, copper, (for nickel), potassium and their compounds. The promoter can be incorporated in the starting solution from which it is precipitated but the promoter can also be incorporated in the catalyst by spraying or impregnation. Generally the promoter is present in an amount ranging from between 0.2 and 14% (based on the total catalyst).

After the precipitation of the catalyst precursor, the precipitate is generally separated by filtration, and, at choice, the cake is subsequently washed and dried. The catalyst precursor is usually washed with water, but sometimes it is advantageous to use organic solvents or surfactant solutions. Drying can be effected by oven-drying or spray-drying. It was noted that most of the catalysts were not substantially affected as to activity and selectivity by the drying conditions. Sometimes impregnation with an aqueous solution of a promoter compound is carried out subsequently. Optionally, drying and grinding to a powder of the proper particle size is carried out, followed, again optionally, by calcining at a temperature of 250° C. -500° C.

Thereafter, the catalyst precursor is activated (=reduced) with hydrogen at a temperature between 250° C. and 600° C., preferably between 350 and 500° C., and this activation is carried out at (super)atmospheric pressure.

The catalysts according to the present invention contain the active metal, which is distributed over the internal and external surface of the alumina support which is formed during calculation and activation of the catalyst precursor.

In another embodiment, the present invention provides a method for the hydrogenation, particularly of unsaturated fatty materials, such as fatty acids, their esters, in particular glycerides and fatty nitriles, at temperatures of 100° C.-230° C. and pressures of 0.1-0.6 Mpa, for fatty nitriles up to 5 MPa.

The nickel-containing catalyst is especially useful in the hydrogenation of polyunsaturated triglycerides such as fish oil, soyabean oil, sunfloWer oil and the like, and leads to the formation of only minor quantities of fully saturated triglycerides. Such hydrogenated oils with an iodine value of e.g. 88-92 combined with a low solid fat content at 30° C. (below 1.0%) are novel, valuable ingredients for the manufacture of oleaginous foodstuffs because they do not cause sandiness (small crystals of solid fats).

The cobalt ($Z=27$) catalyst according to the present invention is especially useful in the hydrogenation of fatty nitrile to fatty amine, wherein high yields of primary amine are obtainable.

The copper ($Z=29$) catalyst according to the present invention is a selective hydrogenation catalyst.

The invention is illustrated by the following examples:

Examples 1-2

To 1 litre ammoniacal nickel solution ($Ni:NH_3=1:9$ molar ratio) containing 2.2% of nickel, a 500 ml sodium aluminate solution was added dropwise at 25° C. in a period of 50 minutes. The aluminum concentration in the sodium aluminate solution was varied in the examples 1-2 so as to give an Ni/Al atomic ratio of 5.3 and 3.2, respectively, in the reaction mixture and in the final precipitate. After complete addition of the sodium aluminate solution, the mixture of the two solutions was heated to the boil (100° C.) in a period of 40 minutes while stirring. At this temperature the ammoniacal nickel complex decomposed, ammonia removed and nickel precipitated. The precipitation of nickel was completed in 80 minutes, after which the reaction vessel was closed and the mixture was kept at the boil for 60 minutes at pH=10. Then the precipitate was filtered off using a Büchner funnel. One part of the precipitate was dried in a spray drier at 220–140° C., while another part was dried in an oven at 120° C.

The dried precipitates were activated by reduction in a 0.1 MPa hydrogen atmosphere at 450° C.

The performance of the resulting catalysts was determined using various methods:

(1) The activity was determined in the hydrogenation of fish oil at 180° C. and 0.1 MPa $H_2$ pressure. The activity was expressed relative to the activity of a standard catalyst ($A_f=100\%$). This method is disclosed in detail in EP-A- 0 168 091 (Unilever), page 8, lines 15-24.

(2) The selectivity was determined in the hydrogenation of a standard soyabean oil (I.V.=130) at 100° C., 0.1 MPa $H_2$ pressure and 0.1% Ni. The hydrogenation was continued until the resulting oil had an iodine value of 90. The percentage of solid fats present in the hydrogenated oil at 30° C. ($N_{30}$) is taken as a yardstick for the selectivity of the catalyst. Consequently a low percentage of solid fat at 30° C. is indicative for highly selective catalyst. The time required to hydrogenate the soyabean oil to an I.V. of 90 was also taken as a measure for the activity.

(3) The oil filtration properties of the catalyst were determined after a hydrogenation of fish oil. The time required to filter 150 grams of oil from the catalyst-oil suspension expressed as minutes per grams of oil was taken as a yardstick for the oil filtration properties This method is disclosed in detail in EP-A- 0 168 091(Unilever), page 8, line 34, page 9, line 19.

The results are given in Table 1.

EXAMPLES 3-5

A 1-litre ammoniacal nickel solution ($Ni:NH_3=1:9$ molar ratio) containing 2.2.% of nickel was heated to the boil in 40 minutes. At the boiling temperature, the ammoniacal nickel complex decomposed, ammonia removed and nickel compound precipitated. The precipitation was completed in 60 minutes. During this period 500 ml of a sodium aluminate solution were added to the boiling reaction mixture. The aluminum concentration in the sodium aluminate solution was varied in the Examples 3-5, so as to give an Ni/Al atomic ratio of 10, 5.6 and 3.7, respectively, in the reaction mixture and in the final precipitate. After the nickel precipitation and the addition of the sodium aluminate solution were completed, the reaction vessel was closed and the mixture was kept at the boil for 60 minutes at pH=10.0. Then the precipitate was filtered off on a Büchner funnel. One part of the precipitate was dried in a spray drier at 220° C.-140° C. while another part was dried in an oven at 120° C.

The dried green cakes were activated by reduction in a 0.1 MPa hydrogen atmosphere at 450° C. The performance of the resulting catalysts was determined by methods as given above (Examples 1-2). The results are given in Table 2.

TABLE 1

|  | Example 1 | Example 2 |
|---|---|---|
| Ni/Al atomic ratio | 5.3 | 3.2 |
| Nickel surface area ($m^2$/g Ni) | 80 | 112 |
| BET total surface area ($m^2$/g cat) | 96 | 144 |
| Average pore radius (nm) | 5.0 | 7.0 |
| Activity in fish oil hydrogenation ($A_f(\%)$) | | |
| after spray drying | 107 | 155 |
| after oven drying | 105 | 135 |
| Selectivity and activity in soyabean oil hydrogenation | | |
| after spray drying $N_{30}$ (%) | below 0.5 | 0.1 |
| Hydrogenation time (min.) | 24 | 18 |
| after oven drying $N_{30}$ (%) | below 0.5 | 0.1 |
| Hydrogenation time (min.) | 24 | 18 |
| Oil filtration (min/g) | 0.1 | 0.7 |

TABLE 1-continued

|  | Example 1 | Example 2 |
|---|---|---|
| (to filter 150 g of oil) |  |  |

TABLE 2

|  | Example 4 | Example 5 | Example 6 |
|---|---|---|---|
| Ni/Al atomic ratio | 10 | 5.6 | 3.7 |
| Nickel surface area (m²/g Ni) | 67 | 113 | 110 |
| BET total surface area (m²/g cat) | 108 | 115 | 126 |
| Average pore radius (nm) | 8.5 | 13.6 | 10.1 |
| Activity in fish oil hydrogenation ($A_f$(%)) |  |  |  |
| after spray drying | 133 | 150 | 155 |
| after oven drying | 125 | 107 | 60 |
| Selectivity and activity in soyabean oil hydrogenation |  |  |  |
| after spray drying | — | — | below 0.5 |
| $N_{30}$ (%) |  |  |  |
| Hydrogenation time (min.) |  |  | 17 |

TABLE 2-continued

|  | Example 4 | Example 5 | Example 6 |
|---|---|---|---|
| after oven drying | 0.2 | 0.1 | below 0.5 |
| $N_{30}$ (%) |  |  |  |
| hydrogenation time (min) | 19 | 22 | 24 |

I claim:

1. Process for the preparation of a hydrogenation catalyst which comprises alumina and an active metal (M) selected from the group consisting of nickel, cobalt, and copper, wherein said process comprises combining an ammoniacal metal ion solution at temperatures between 10° C. and 85° C. with an aqueous solution of an aluminum compound, removing ammonia by keeping the solution at or near the boiling point for 20 to 180 minutes, and precipitating $M_6Al_2(OH)_{16}CO_3 \cdot 4H_2O$, which precikpitate is collected, dried and reduced with hydrogen.

2. Process according to claim 1, in which the catalyst has an average pore radius between 4 and 15 nanometers.

3. Process according to claim 1, in which to an ammoniacal metal ion solution being at a temperature between 15° C. and 50° C.

* * * * *